United States Patent
Rannenberg

[15] 3,699,777
[45] Oct. 24, 1972

[54] CAPACITY CONTROL FOR GAS TURBINE POWERED AIR CYCLE REFRIGERATION SYSTEM

[72] Inventor: George C. Rannenberg, Canton, Conn.

[73] Assignee: United Aircraft Corporation, Hartford, Conn.

[22] Filed: April 9, 1971

[21] Appl. No.: 132,837

[52] U.S. Cl.....................................62/172, 62/402
[51] Int. Cl..............................................F25b 9/00
[58] Field of Search .................62/87, 172; 165/15

[56] References Cited

UNITED STATES PATENTS

| | | |
|---|---|---|
| 2,562,918 | 8/1951 | Hynes..........................62/86 X |
| 2,632,307 | 3/1953 | Massey..........................62/172 |
| 2,752,891 | 7/1956 | Farkos..........................62/172 |

Primary Examiner—William J. Wye
Attorney—Norman Friedland

[57] ABSTRACT

For a gas turbine powered air cycle refrigeration package which gas turbine is normally operated at a constant speed and is operatively connected to a compressor or fan for feeding air to the package. The quantity of air through the compressor or fan is regulated for conserving the energy of the power plant. The air flow through the compressor is regulated as a function of an error signal between the desired and actual temperature produced by the air cycle refrigeration system.

8 Claims, 2 Drawing Figures

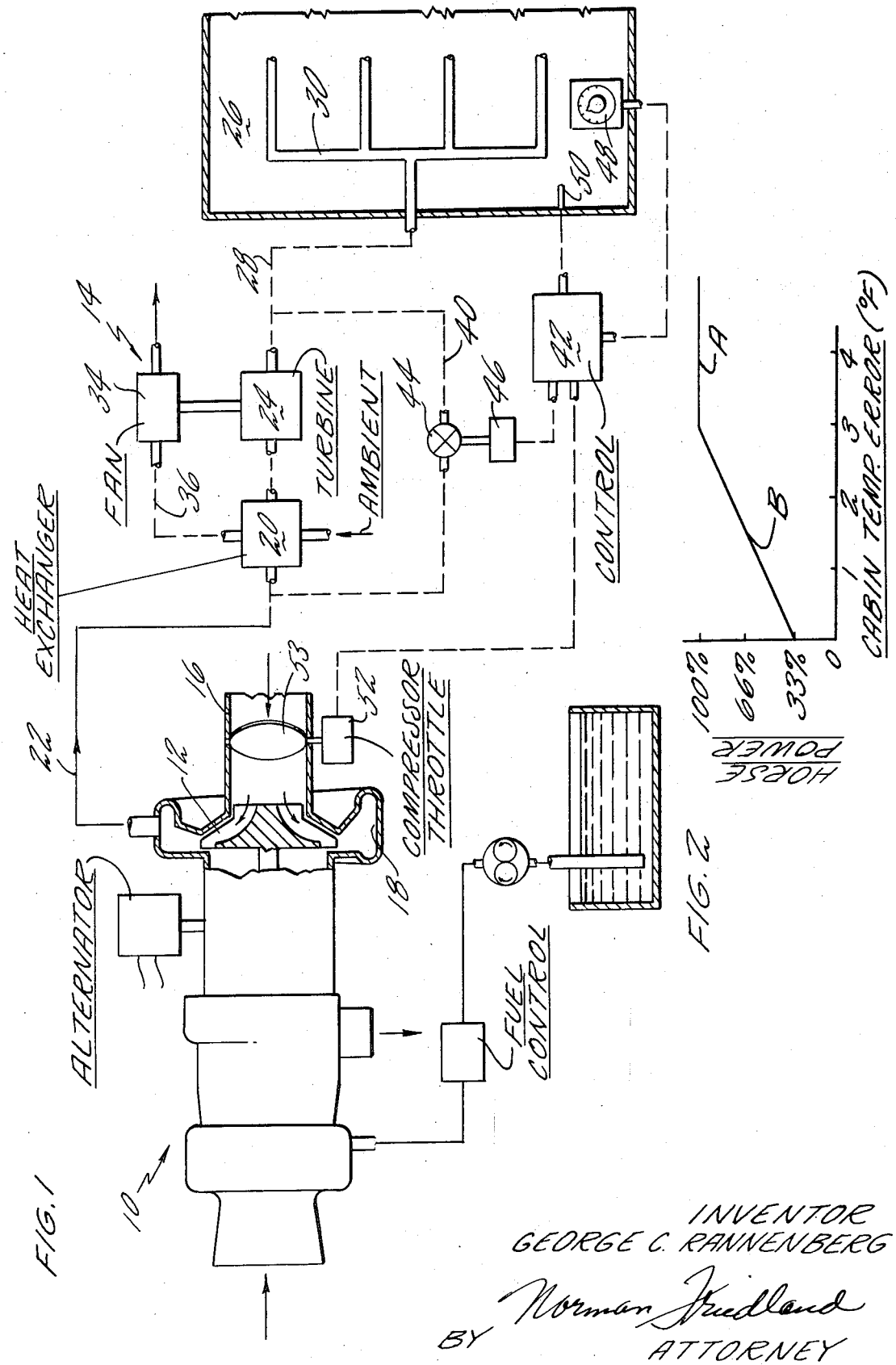

3,699,777

CAPACITY CONTROL FOR GAS TURBINE POWERED AIR CYCLE REFRIGERATION SYSTEM

BACKGROUND OF THE INVENTION

This invention relates to air cycle refrigeration systems for aircraft which utilize an auxiliary power package consisting of a jet engine and particularly to the controls therefor.

With the advent of large body aircraft it is will known to utilize a separate gas turbine engine for powering the air cycle air-conditioning system. This gas turbine is operatively connected to a compressor serving to feed ram or ambient air through a typical air cycle refrigeration package. A portion of the air bypasses the cooling turbine of the air cycle package and is mixed with cooling turbine discharge air in order to obtain the desired temperature and circulation requirements. Heretofore, such systems operated at full capacity for all aircraft flight and ground operation conditions, so that the gas turbine engine powering the cooling package operates at maximum horsepower regardless of the cabin cooling requirements.

Thus, I have found that I can conserve on fuel consumption, abate noise and exhaust product pollution, and extend the life of the auxiliary power plant by causing the gas turbine to operate at full power only when the actual measured cabin temperature differs significantly from the desired temperature, and automatically reducing gas turbine power as the cabin temperature error approaches zero.

SUMMARY OF INVENTION

An object of this invention is to provide improved control for an auxiliary gas turbine driving a compressor for an aircraft air-conditioning package, which gas turbine operates at a constant rotational speed. Means is provided for varying the flow produced by the compressor as a function of the difference between desired cabin temperature and actual cabin temperature.

A still further object of this invention is to provide throttling means at the inlet or outlet of a compressor driven by a gas turbine as a function of a predetermined differential between desired cabin temperature and actual cabin temperature.

A still further object of this invention is to provide in an air-conditioning system driven by an auxiliary gas turbine operating at a constant speed to vary the capacity or power of the gas turbine in order to economize on fuel and extend the life of the gas turbine.

Other features and advantages will be apparent from the specification and claims and from the accompanying drawings which illustrate an embodiment of the invention.

BRIEF DESCRIPTION OF THE DRAWINGS

FIG. 1 is a view partly in schematic, partly in elevation and partly in sectional illustrating the details of the present invention.

FIG. 2 is a graphical illustration showing the operating characteristics of the invention.

DESCRIPTION OF THE PREFERRED EMBODIMENT

Referring now to FIG. 1, a suitable gas turbine generally indicated by numeral 10 serves to drive compressor 12 for delivering air to the air-conditioning package generally illustrated by numeral 14. A suitable auxiliary power package may, for example, be the PT-6 jet engine manufactured by United Aircraft of Canada Limited to which compressor 12 may be driven by its free turbine (not shown). Air obtained from a ram scoop (not shown) is admitted at the inlet 16 of the compressor where it is compressed by compressor 12, collected at the annulus 18 and fed to a heat exchanger 20 via line 22. Energy in the nature of heat is extracted from the air in a well-known manner by turbine 24 for delivery to the aircraft cabin 26 via line 28 and the distributor ducting 30. Turbine 24 drives a fan 34 which serves to load the turbine and also for inducing flow through heat exchanger 20 via line 36 noting that the compressor discharge air and the ambient admitted into heat exchanger 20 are in indirect heat exchange relation. Such air cycle refrigeration packages are well known in the art and a detailed description is omitted herefrom for the sake of clarity and simplicity. A portion of the compressor discharge air is bypassed around the air-conditioning package via line 40 and is mixed with a turbine discharge air in line 28. Since the air upstream of the refrigeration package is hotter than the air discharging from the turbine, the airs are mixed in order to obtain the desired temperature in the cabin. For more detail of an air cycle refrigeration system reference is hereby made to U.S. Pat. No. 2,867,989 granted to T. J. McGuff on Jan. 13, 1959, and U.S. Pat. No. 2,917,288 granted to J. S. Sims, Jr. et al. on Dec. 15, 1959.

A suitable electronic temperature controller represented by the blank box 42 serves to control valve 44 via conductor 46 in order to hold the temperature at the desired selected level. Temperature selector 48 located in the cabin is positioned to select the desired temperature. Actual temperature is sensed by suitable temperature sensor 50 which signal is fed to the electronic temperature controller which compares the actual temperature and the desired temperature in order to produce temperature error signal which is in turn relayed to the actuator 46 for opening and closing valve 44. Valve 44 controls the warmer air and the rate of mixing with the turbine discharge air in order to eliminate the temperature error computed by the electronic controller.

What has been described above is well known in the art and does not constitute part of this invention. It is to be understood, however, that the type of gas turbine in which this invention is efficacious is one where the speed of the gas turbine output shaft driving compressor 12 is maintained at a constant value. In heretofore practices it has been customary to operate compressor 12 at its particular maximum power absorption level regardless of the load requirements of the air cycle package. In accordance with the present invention, as cabin temperature error approaches zero, the compressor airflow, and therefore gas turbine power, is automatically cut back by reducing the load on compressor 12 by varying the air at the inlet by adjusting valve 53 in accordance with the signal generated by the electronic controller 42. Valve 53 being connected to actuator 52 therefore is opened and closed in order to admit more or less air into the compressor 12. It is to be understood that the throttling may be equally effective at the outlet of the compressor where the compressor is integral with the engine compressor rather than separate as is shown in the embodiment of FIG. 1. The operation of this invention can best be understood by referring to the graph illustrated in FIG. 2 where the abscissa is in horsepower required of the gas turbine to drive compressor 12 at constant speed, and the ordinate is in cabin temperature error in degrees Fahrenheit. It will be appreciated that when the cabin temperature error is above a predetermined value such as 3° F., the gas turbine is operating at 100 percent horsepower illustrated by line A and as the cabin temperature error decreases below 3° F., horsepower on the gas turbine is reduced to a predetermined low minimum value which in this instance is 33 percent of the total horsepower available from the engine as illustrated by line B. The lower limit of flow, when the cabin temperature is satisfied, is selected to provide ventilation for odor removal, which is usually accomplished with about one-third of the flow required for full cooling or heating capacity. It is to be understood that the load on the compressor obviously determines the horsepower necessary for the gas turbine to develop in order to maintain the constant desired speed at which the gas turbine is set to operate.

The gas turbine fuel control will automatically reduce fuel flow to the engine when the power demands are reduced. The fuel flow will be sufficient to maintain rotational speed at a constant value and obviously is a function of developed horsepower. Therefore below the preselected 3° F. temperature error signal, the fuel will be reduced with a consequential reduction of horsepower. Obviously, operating the gas turbine at a reduced horsepower rating will have the tendency of extending its life, reducing noise and air pollution, and lowering operating cost by reducing fuel consumption.

It should be understood that the invention is not limited to the particular embodiments shown and described herein, but that various changes and modifications may be made without departing from the spirit or scope of this novel concept as defined by the following claims.

I claim:

1. In a combined air-conditioning system for aircraft cabin whose air intended to be conditioned is supplied by an auxiliary gas turbine engine driving an air moving member, the output shaft of said gas turbine engine being operated at a constant speed and the power produced thereby which is absorbed partially by said air moving member is changed by adjusting fuel flow, the air-conditioning system being of the type that mixes warmer air with cooler air to satisfy condition requirements, the improvement comprising means for measuring the difference between the set and actual temperature values of the cabin for producing a temperature error signal, means for imposing a load on said air moving member and means responsive to said error signal for actuating said load imposing means for loading and unloading said air moving member as a function of said temperature error signal, whereby the compressor is loaded and unloaded to reduce power developed by said gas turbine engine at a predetermined temperature error signal.

2. In a combination as claimed in claim 1 wherein said air moving member is a fan or compressor.

3. In a combination as claimed in claim 2 wherein said load imposing means changes the air flow through said fan or compressor.

4. In a combination as claimed in claim 3 wherein said load imposing means is disposed immediately upstream or downstream of said fan or compressor.

5. In a combination as claimed in claim 1 wherein said temperature measuring means also controls the mixing of said warmer and cooler air.

6. In a combination as claimed in claim 1 wherein said temperature measuring means includes a temperature setting member and a temperature sensor.

7. For an air-conditioning system for aircraft cabins whose air intended to be cooled is supplied by an air moving member driven by an auxiliary gas turbine engine, said gas turbine engine being operated at a constant speed and the power produced which is absorbed by said air moving member is changed by adjusting fuel flow, the air-conditioning system being air cycle system having an air turbine for adiabatically removing heat from the air, a bypass around said turbine, means for mixing said turbine discharge air with said bypass air, the improvement comprising means for reducing power requirements developed by said gas turbine engine, said means including means for measuring the difference between the set and actual temperature values of the cabin for producing a temperature error signal, means for imposing a load on said air moving member and means responsive to said signals for actuating said load imposing means for loading and unloading said air moving members as a function of said temperature error signal.

8. For an air-conditioning system as claimed in claim 7 wherein said air moving is a fan or compressor and said load imposing means is disposed immediately upstream or downstream of said fan or compressor.

* * * * *